United States Patent
Langouet et al.

(12) United States Patent    (10) Patent No.: US 6,872,006 B2
(45) Date of Patent: Mar. 29, 2005

(54) FIBER OPTIC CABLE ASSEMBLY

(75) Inventors: Luc Jean Langouet, Fisherville, VA (US); Harry Wright Baum, Waynesboro, VA (US)

(73) Assignee: Virginia Panel Corporation, Waynesboro, VA (US)

( * ) Notice: Subject to any disclaimer, the term of this patent is extended or adjusted under 35 U.S.C. 154(b) by 0 days.

(21) Appl. No.: 09/795,453

(22) Filed: Mar. 1, 2001

(65) Prior Publication Data

US 2004/0038558 A1 Feb. 26, 2004

Related U.S. Application Data (60) Provisional application No. 60/186,746, filed on Mar. 3, 2000.

(51) Int. Cl.[7] ............................ G02B 6/36; H01R 13/64; H01R 13/627
(52) U.S. Cl. ....................... 385/53; 439/352; 439/362; 439/378
(58) Field of Search ........................... 439/50, 51, 352, 439/353, 362, 355, 357, 358, 363, 378; 403/329; 385/53; 411/174, 175, 522

(56) References Cited

U.S. PATENT DOCUMENTS

| | | | |
|---|---|---|---|
| 3,869,760 A | * 3/1975 | Meyer | 24/562 |
| 4,329,005 A | 5/1982 | Braginetz et al. | 439/51 |
| 4,606,688 A | * 8/1986 | Moran et al. | 411/175 |
| 5,232,378 A | * 8/1993 | Weingartner | 439/354 |
| 5,348,494 A | * 9/1994 | Falossi et al. | 439/362 |
| 5,601,446 A | * 2/1997 | Wright | 439/357 |
| 5,625,731 A | * 4/1997 | Turgeon et al. | 385/53 |
| 5,639,261 A | * 6/1997 | Rutkowski et al. | 439/534 |
| 6,056,577 A | * 5/2000 | Blanchet | 439/352 |
| 6,093,057 A | * 7/2000 | Lok | 439/607 |
| 6,273,742 B1 | * 8/2001 | Castagna et al. | 439/362 |
| 6,309,113 B1 | * 10/2001 | Naito | 385/88 |
| 6,338,631 B1 | * 1/2002 | Hashimoto et al. | 439/79 |

FOREIGN PATENT DOCUMENTS

FR            0691712      * 1/1996

\* cited by examiner

*Primary Examiner*—Michael C. Zarroli
(74) *Attorney, Agent, or Firm*—DeWitt Roggin, PLLC

(57) ABSTRACT

A new apparatus for facilitating connections between fiber optic cables. A fiber optic cable assembly having a retainer ring, a spring, and clip attaches a fiber optic cable to an ITA or receiver connector housing. An alignment sleeve assembly having an alignment sleeve housing, and alignment sleeve, and a clip attaches between the faces of a receiver module and an ITA module when they are mated. The receiver or ITA module includes a module support bracket and spring assembly for separating the travel and force required for mating the fiber optic cables from the force and travel required for mating a receiver and ITA.

10 Claims, 11 Drawing Sheets

FIBER OPTIC CABLE ASSEMBLY

CROSS-REFERENCE TO RELATED APPLICATION

The present application is a related to and claims priority to U.S. Provisional Patent Application Ser. No. 60/186,746 filed Mar. 3, 2000.

STATEMENT REGARDING FEDERALLY SPONSORED RESEARCH OR DEVELOPMENT

Not applicable.

BACKGROUND OF THE INVENTION

1. Field of the Invention

The present invention relates to fiber optic connectors and mass interconnect or interface devices. More particularly, the invention relates to a new and novel assembly for a fiber optic connector that increases the cycle life of that fiber optic connector when used in a mass interconnect device.

2. Description of the Related Art

An interface or mass interconnect device includes a receiver and an Interface Test Adapter (ITA) that are mated together to form connections between connectors mounted in modules in the receiver and ITA. An example of one such mass interconnect or interface device is disclosed in U.S. Pat. No. 4,329,005. Commercially available examples of such interface devices include, but are not limited to, Virginia Panel Corporation's Series 90 and Gemini interface devices. In such interface devices, it has often been desirable to include multiple types of electrical connectors in a single interface. To do so, one may incorporate separate modules for each type of connector or may create modules that accommodate multiple types of connectors.

Due to recent advances in technology, it has become desirable to include fiber optic connectors in such interface devices. Including both fiber optic connectors and electrical connectors together in a single interface device, however, has raised new problems. One such problem is that fiber optic connectors require a shorter travel distance to make a connection than do some other types of connectors. When fiber optic connectors are used in an interface device with other types of connectors, this difference in required travel distances can result in unnecessarily strong forces being applied to the tips of the fiber optic cables being connected. Such unnecessarily high forces can cause damage to the tips of the fiber optic cables. Further, some fiber optic connectors require axial positioning, which is not necessary for many other types of connectors.

Thus, conventional fiber optic connectors suffer from the problems of having limited cycle lives between polishings and/or limited repolishings before needing to be replaced. Connectors such as the M29504 type termini, which have a two thousand mating cycle specification, have only a very limited amount of travel (0.030") for the termini to work. This limited travel reduces the number of times the termini can be re-polished before needing to be replaced. These termini additionally suffer from the problems of high cost and difficulty in obtaining good termini performance.

In contrast, termini having significant travel (0.090"), such as a TFOCA type termini, have a five hundred mating cycle specification, but they can be re-polished and then work for another 500 cycles. By observing the termini tip under a microscope, however, the inventors have found that the fiber-cladding, material that surrounds the core of the optical fiber, was flaking apart and thereby making the termini fail. The cladding fails due to material surface fatigue, like a bearing surface without lubrication.

During the connector mating the two termini surfaces are in contact and exposed to limited motion perpendicular to the termini axis. During this motion, point contacts are created with a significant force (1.5 lb) applied at the same time. This causes very localized high surface pressure that results in the fiber-cladding material failure.

SUMMARY OF THE INVENTION

The present invention has been made in view of the above circumstances and has as an object to provide a fiber optic cable assembly that can increase the number of cycles the termini of a fiber optic connector may be used without re-polishing. The present invention allows the use of a termini such as the TFOCA type termini for about 4000 cycles without re-polishing. The present invention achieves this result by separating the required travel and force for the termini to be in contact with 1.5 lb load from the interface clamping travel and force. By doing this, the invention eliminates the termini motions during the clamping action.

A further object of the invention is to provide a cable clip attachment for a module to allow easy installation, inspection, cleaning and replacement of any cable on the module. The cable clips of the invention also position and prevent the termini from rotating inside the module. The present invention uses only one part (the clip) to secure and position (angularly and axially) the termini compared to prior devices that uses about 3 parts.

Additional objects and advantages of the invention will be set forth in part in the description which follows and in part will be obvious from the description, or may be learned by practice of the invention.

BRIEF DESCRIPTION OF THE DRAWINGS

The accompanying drawings, which are incorporated in and constitute a part of this specification illustrate some embodiments of the invention and, together with the description, serve to explain the objects, advantages, and principles of the invention. In the drawings, FIGS. 1(a), (b) and (c) are bottom, side, and end views of a receiver module assembly of one embodiment of the present invention.

FIGS. 4(a), (b), and (c) are bottom, side, and end views of an ITA module assembly of one embodiment of the present invention.

FIGS. 5(a) and (b) are side and top views of a module guide pin of the present invention.

FIGS. 6(a), (b), and (c) are top, side, and front views of module support bracket of the present invention.

FIGS. 12(a) and (b) are top and side views of a termini sub-assembly of the present invention.

FIGS. 16(a), (b), and (c) are front, side, and detail views of a retainer clip removal tool for use with the present invention.

DETAILED DESCRIPTION OF THE PREFERRED EMBODIMENTS

Figure 1A:
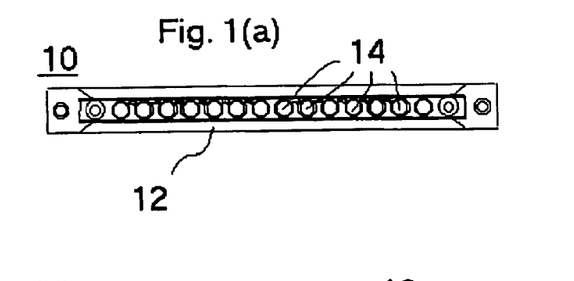
Figure 1B:
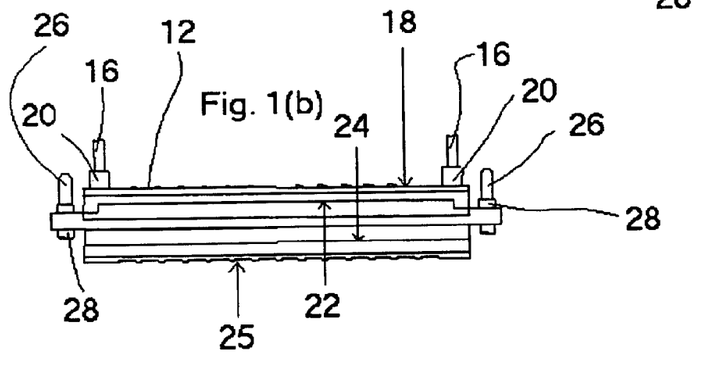
Figure 1C:
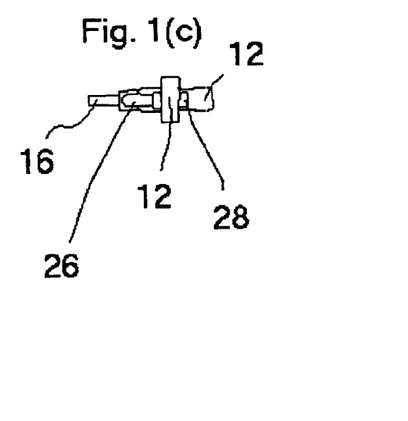
Figure 2A:
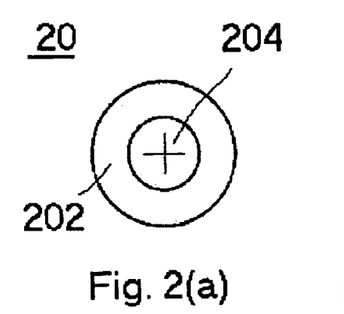
FIGS. 2(a) and (b) are top and side views of a connector stop of the present invention.
Figure 2B:
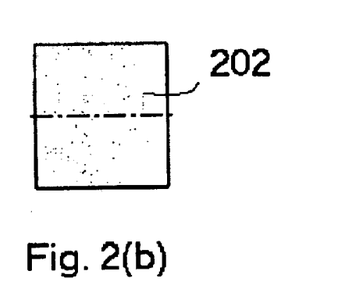
Figure 3A:
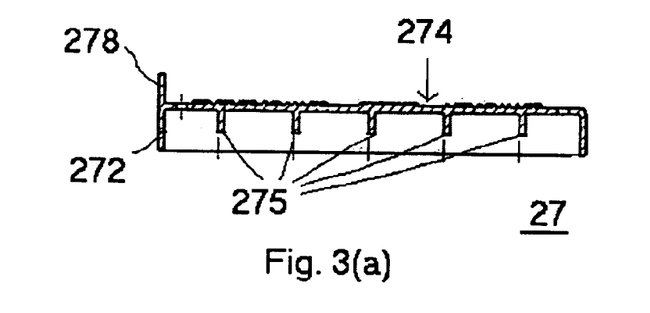
FIGS. 3(a), (b), and (c) cross-sectional, bottom, and end views of a connector module cover of the present invention.
Figure 3B:
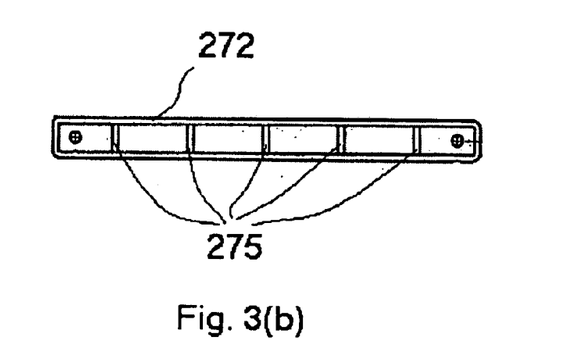
Figure 3C:
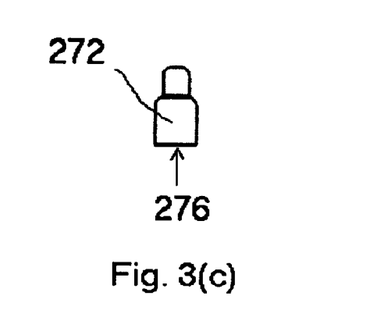

A receiver module assembly of the present invention is described with reference to FIGS. 1(a), (b), and (c). The receiver module assembly 10 includes a receiver connector housing 12 having a plurality of openings 14 for receiving connectors. An alignment pin 16 projects from the face 18 of the connector housing 12 at each of its two ends. A connector stop 20 surrounds the base of each of the two pins 16. The stop 20 is shown in greater detail in FIGS. 2(a) and (b). The stop 20 has a cylindrical wall 202 and an opening 204 throughout its center for receiving a guide pin 16. The stop 20, of course, could be formed in other shapes. The receiver connector housing 12 further includes on each side near its face 18 a ridge 22 for receiving a clip The receiver module assembly further includes on each of its sides a ridge 24 near the back side 25 of the connector housing 12. A connector module cover 27, shown in FIGS. 3(a), (b), and (c) may be placed over the face of the receiver connector housing to protect the fiber optic cables when not mated to an interface test adapter. The connector module cover 27 includes a housing 272 having a closed face 274 at each end of the connector module cover 27. The interior of the connector module cover 27 may include a series of ribs 275.

Figures 4A, 4B, 4C, 6A:
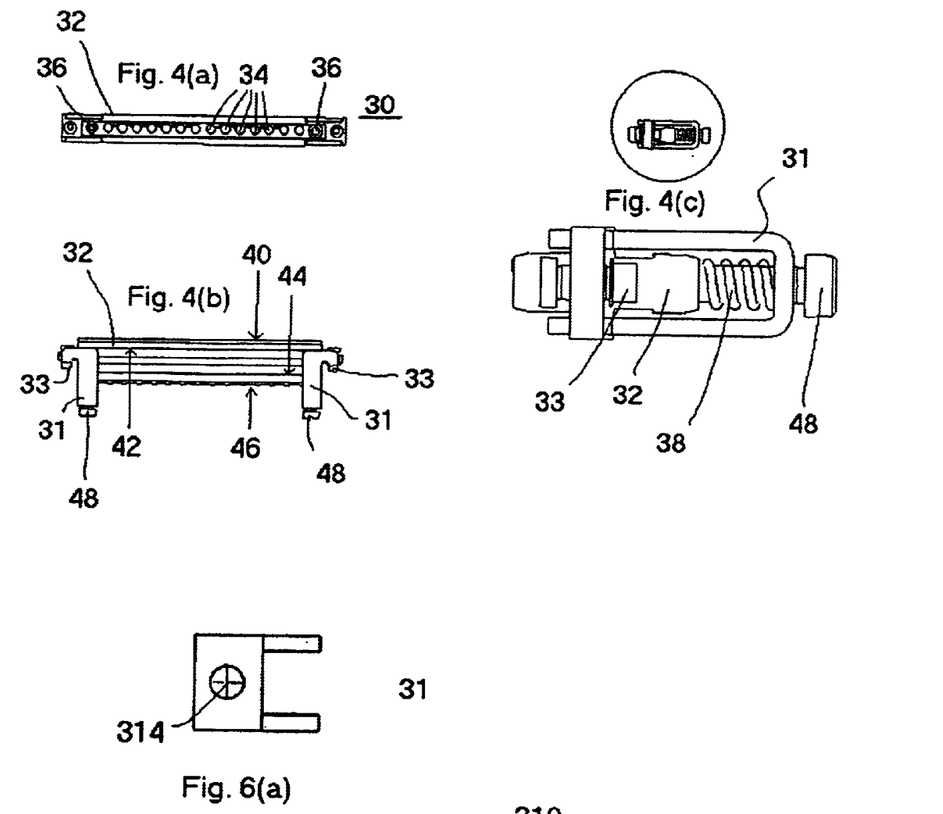
Figures 5A, 5B:
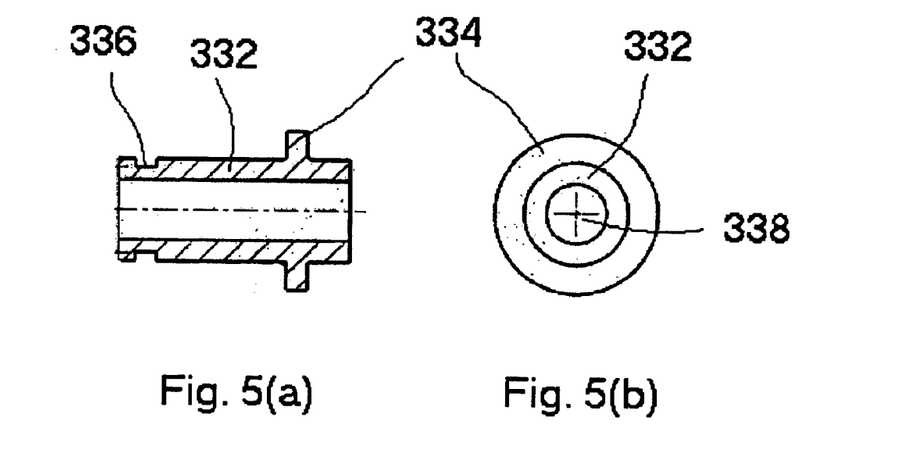
Figure 6B:
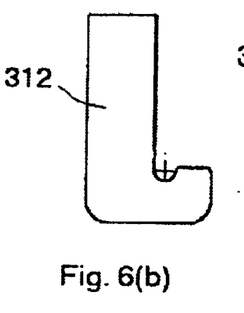
Figure 6C:
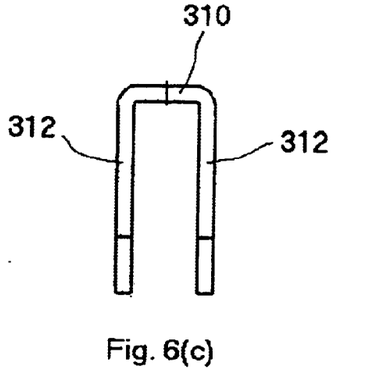

An ITA module assembly 30 is described with reference to FIGS. 4(a), (b), and (c). The ITA module assembly 30 comprises an ITA connector housing 32 having a plurality of openings 34 for receiving connectors. The ITA connector housing 32 has a hole 36 at each end for receiving a pin 16 in the receiver module assembly 10. The ITA connector housing 32 further has a hole with a module guide 33 therein near each end. The module guide 330 is shown in greater detail in FIGS. 5(a) and (b). The module guide has a cylindrical wall 332, with a protrusion 334 around its circumference near one end and a groove around its circumference near the other end. The module guide pin has a hole 338 extending from top to bottom for receiving the guide pin 26. The ITA module assembly further comprises an ITA module spring assembly 38, shown in FIG. 4(c), for securing the ITA module assembly 30 to the receiver module assembly 10 when they are mated. The ITA module spring assembly 38 comprises a shoulder screw or guidepost 48, a module support bracket 31, and a spring 39. The module support bracket 31 is shown in greater detail in FIGS. 6(a), (b), and (c). The module support bracket 31 includes a base 310 and two sides 312. The base 310 includes a hole 314 for receiving a guidepost 48. The ITA connector housing 32 further has on each side near its face 40 a ridge 42 for receiving a clip. Likewise, the ITA connector housing 32 further has a ridge 44 near the back side 46 of the ITA connector housing 32 for receiving a clip.

Figure 7A:
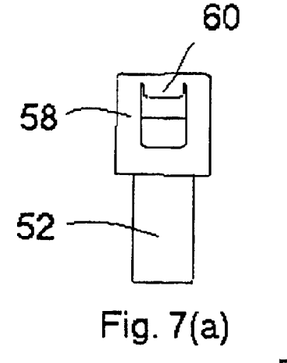
FIGS. 7(a), (b), and (c) are side, top, and cross-sectional views of an alignment sleeve assembly of the present invention.
Figure 7B:
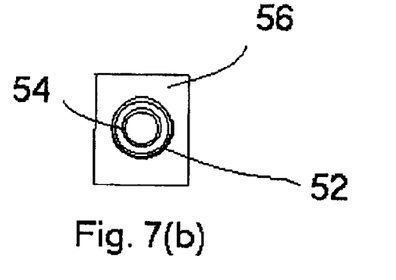
Figure 7C:
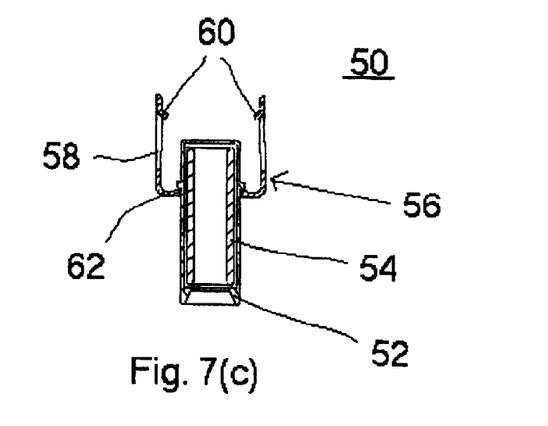
Figure 8A:
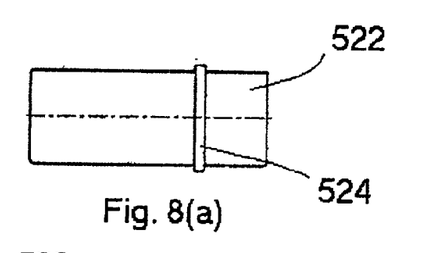
FIGS. 8(a), (b), and (c) are side, top, and cross-sectional views of an alignment sleeve housing of the present invention.
Figure 8B:
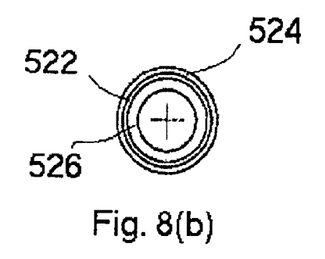
Figure 8C:
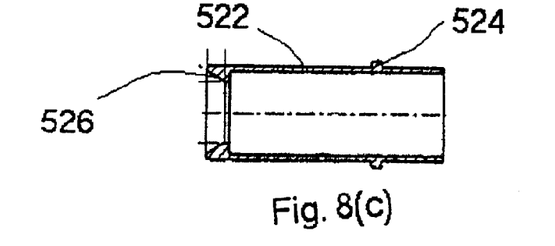
Figure 9A:
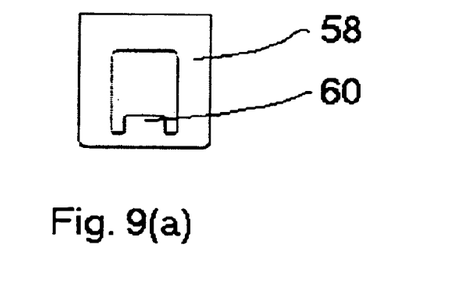
FIGS. 9(a), (b), and (c) are side, top, and cross-sectional views of an alignment sleeve retainer clip of the present invention.
Figures 9B, 9C:
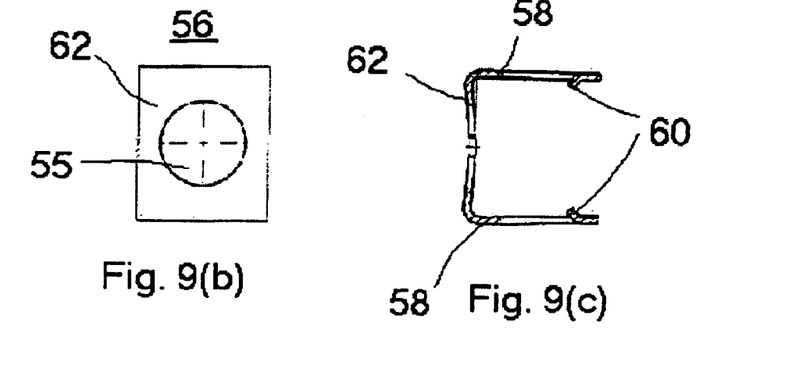
Figure 10A:
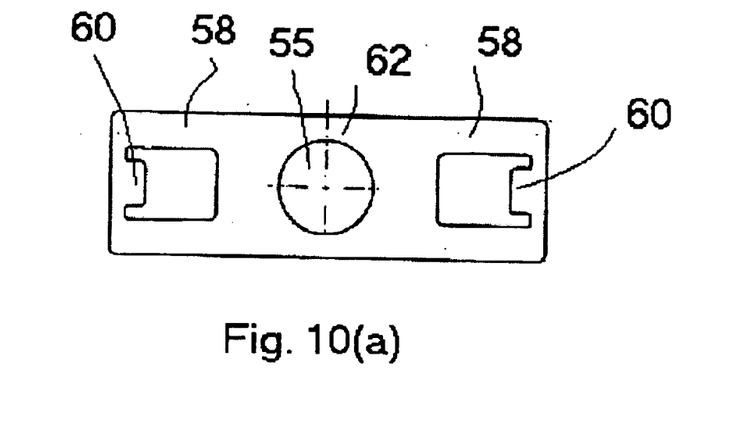
FIGS. 10(a) and (b) are top and side views of an alignment sleeve retainer clip of the present invention during a production stage.
Figure 10B:
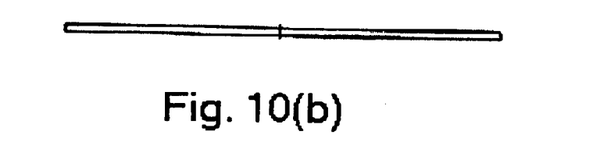

FIGS. 7(a), (b), and (c) illustrate an alignment sleeve assembly 50. The alignment sleeve assembly 50 is comprised of an alignment sleeve housing 52, an alignment sleeve 54, and a sleeve retainer clip 56. The alignment sleeve housing 52 is shown in greater detail in FIGS. 8(a), (b), and (c). The alignment sleeve housing includes a cylindrical side wall 522 having a protrusion or stop 524 around its circumference along a small portion of its length. The center of the alignment sleeve housing 52 is hollow for receiving fiber optic connectors. At one end of the alignment sleeve, a portion 526 of the side walls 522 projects inward toward the center of the housing thereby narrowing the opening at one end of the alignment sleeve housing 52 and creating a step for retaining the alignment sleeve 54 within the alignment sleeve housing 52. The open end of the alignment sleve housing 52 is tolled over after the alignment sleeve 54 is inserted to retain alignment sleeve 54. The alignment sleeve retainer clip 56, shown in greater detail in FIGS. 9(a), (b), and (c) includes on each of its sides 58 a retainer prong 60 projecting slightly toward the other side of the clip and the base 62 of the clip 56. The base 62 of the sleeve retainer clip 56 includes a circular hole 55 for receiving the alignment sleeve housing. FIGS. 10(a) and (b) show the sleeve retainer clip in a production stage. The alignment sleeve assembly 50 connects to the ITA module assembly 30. The end of the alignment sleeve housing 50 that projects between the sides of the clip is inserted into the holes in the face 40 of the ITA module assembly. When the alignment sleeve housing 50 is so inserted the sides of the clip extend around the sides of the connector housing 32 and snap onto the ridge 42 on the connector housing 32, thereby securing the alignment sleeve housing 50 in place on the ITA connector housing.

Figure 11:
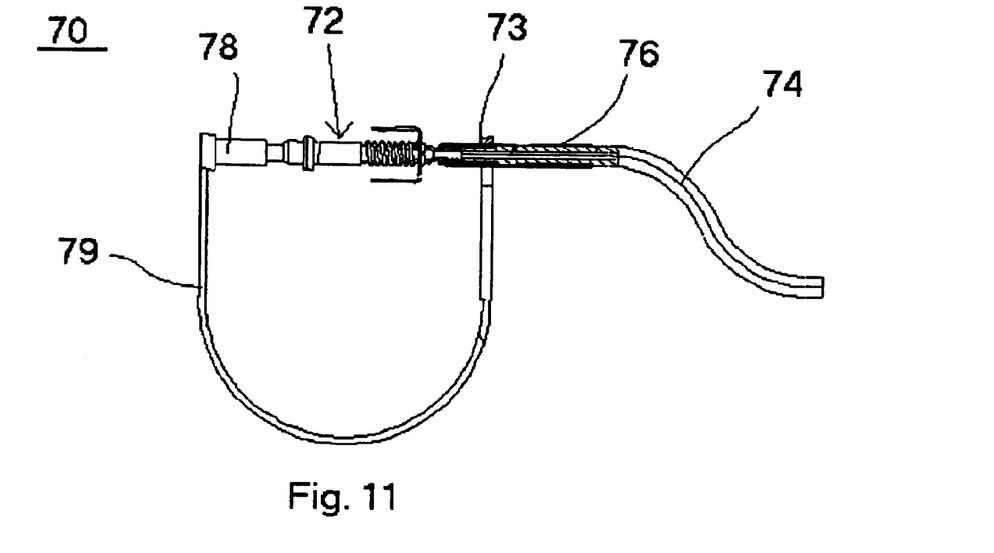
FIG. 11 is a diagram of a fiber optic cable assembly of the present invention.
Figures 12A, 12B:
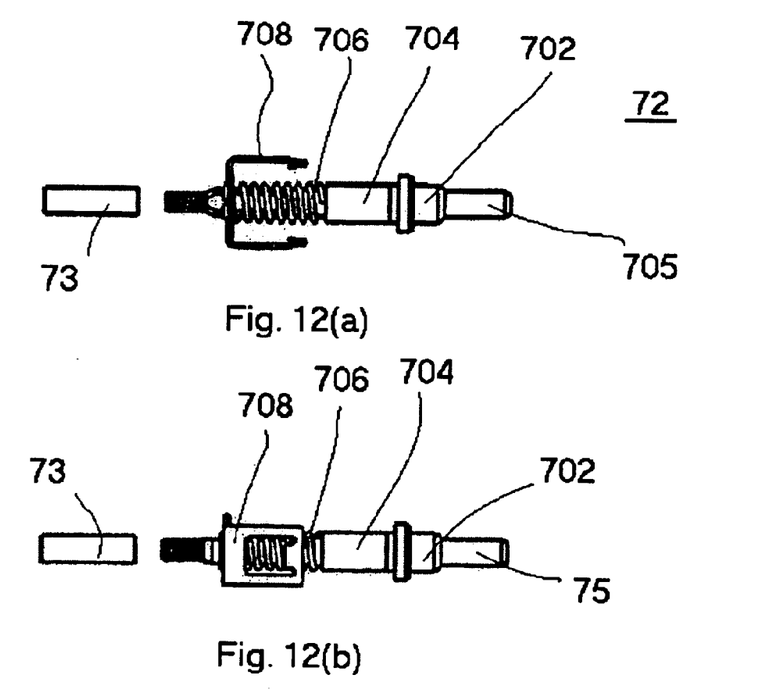

A fiber optic cable assembly 70 incorporating the present invention is described with reference to FIG. 11. The same design of fiber optic cable assembly 70 is used on each side of the interface, i.e., the receiver module assembly side and the ITA module assembly side. The fiber optic cable assembly 70 includes a termini subassembly 72, a fiber optic cable 74, shrink tubing 76, and a dust cap 78. The termini subassembly, shown in FIGS. 12(*a*) and (*b*) includes a pin or termini body 702, a spacer 704, a termini spring 706, and a termini retainer clip 708. In the fiber optic cable assembly 70, the termini sub assembly 72 is connected to a fiber optic cable 74 using a crimp sleeve 73; Shrink tubing 76 is placed over the crimp sleeve 73 and extends beyond the crimp sleeve on each end to respectively cover a portion of the fiber optic cable 74 and a portion of the pin body 702. The termini spring 706 biases the termini retainer clip 708 away from ferrule or tip 705 of the termini body 702. When the fiber optic cable assembly is not in use, a dust cap 78 may be placed over the ferrule or tip 705 of the termini body 702 to protect the fiber optic cable end. The dust cap 78 may be connected to the fiber optic cable assembly 70 with, for example, a plastic strip 79 to prevent loss of the cover when the fiber optic cable assembly is in use.

Figure 13A:
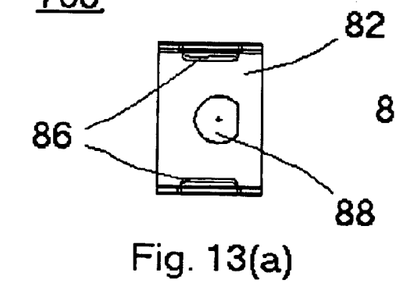
FIGS. 13(a), (b), and (c) are top, side, and cross-sectional views of a termini retainer clip for a fiber optic cable assembly of the present invention.
Figure 13B:
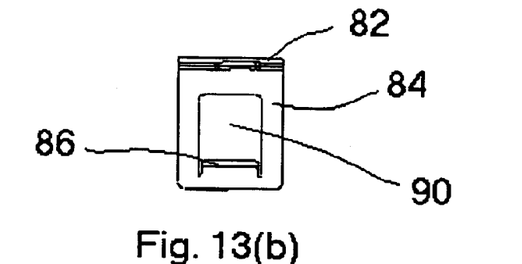
Figure 13C:
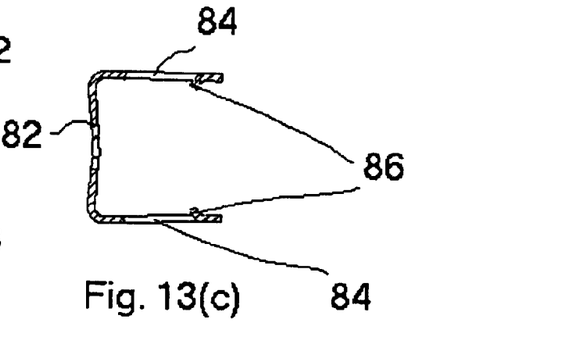

A first preferred embodiment of the termini retainer clip 708 is shown in detail in FIGS. 13(*a*), (*b*), and (*c*). The clip includes a base 82 and two sides 84 extending from the base 82. Each side 84 includes a retainer prong 86 projecting slightly toward the center of the clip and toward the base 82 and an opening 90 above each retainer prong 86. The base 32 of the clip has a D-shaped hole 88 for receiving a termini body 702. Also shown in FIG. 4 is a dust cover 75.

Figure 14A:
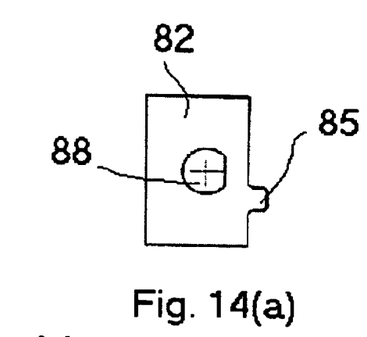
FIGS. 14(a), (b), and (c) are top, side, and cross-sectional views of a second embodiment of a termini retainer clip for a fiber optic cable assembly of the present invention.
Figure 14B:
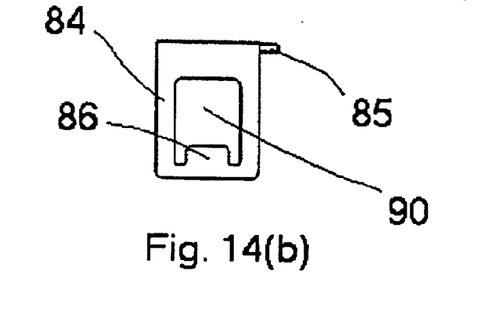
Figure 14C:
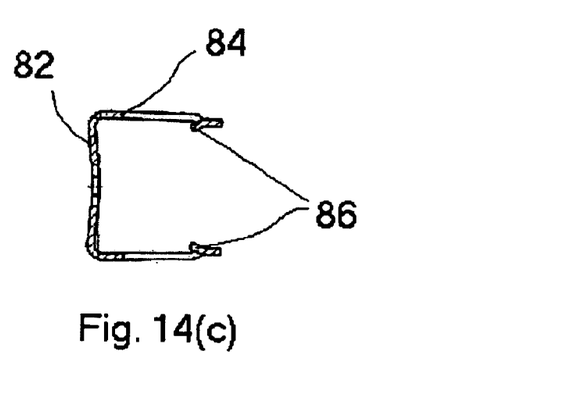

In a second preferred embodiment of the retainer clip, shown in FIGS. 14(*a*), (*b*), and (*c*), the termini retainer clip further includes a tab 85 for ensuring proper installation of the fiber optic cable assembly into the receiver or ITA module connector housing 12 or 32. When using this embodiment, the back side 46 of the receiver or ITA module connector housing 12 or 32 includes a groove (not shown) on one side for receiving the tab 85 on termini retainer clip 708. In this manner, an operator can easily determine the correct orientation of the termini sub assembly with respect to the receiver or ITA module connector housing 12 or 32.

Figure 26:
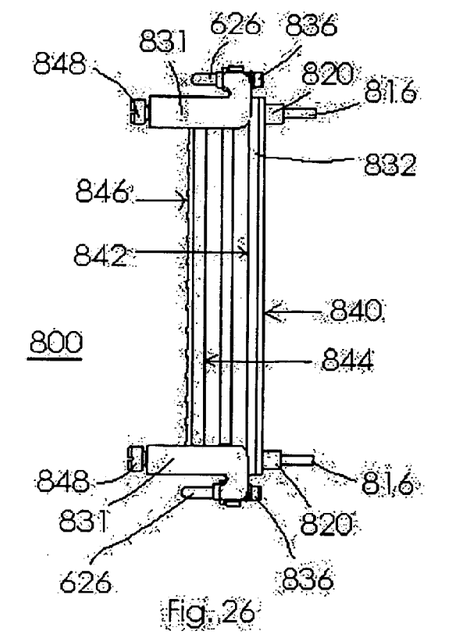
FIG. 26 is a side view of a receiver module assembly in a second embodiment of the invention.
Figure 27:
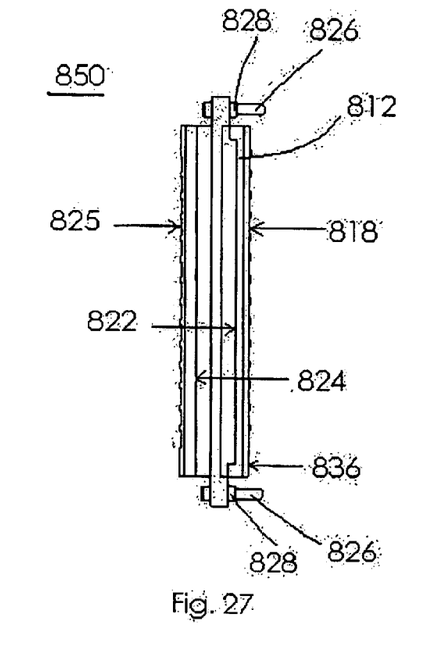
FIG. 27 is a side view of an ITA module assembly in a second embodiment of the invention.

Many other alternative embodiments would be apparent to one skilled in the art from the above disclosure. For example, the structures of the receiver module assembly of FIGS. 1(*a*), (*b*) and (*c*) and the ITA module assembly of FIGS. 4(*a*),(*b*), and (*c*) could be switched such that the receiver module assembly would include the module support bracket while the ITA module assembly would not. FIGS. 26 and 27 depict such an alternative embodiment.

An alternative embodiment of a receiver module assembly 800 is described with reference to FIG. 26. The receiver module assembly 800 comprises a receiver connector housing 832 having a plurality of openings 834 (not shown) for receiving connectors. The receiver connector housing 832 has a pin 816 in the ITA module assembly 810 shown in FIG. 27. An alignment pin 816 projects from the face 840 of connector housing 832 at each of its two ends. A connector stop 20 surrounds the base of each of the two pins 816. The receiver module assembly 800 further comprises a receiver module spring assembly 838, with similar structure to that shown in FIG. 4(*c*), for securing the receiver module assembly 800 to the ITA module assembly 850, shown in FIG. 27, when they are mated. The receiver module spring assembly 838 comprises a shoulder screw or guidepost 848, a module support bracket 831, and a spring 839 (not shown). The module support bracket 831 includes a base and two sides. The base includes a hole for receiving a guidepost. The receiver connector housing 832 further has on each side near its face 840 a ridge 842 for receiving a clip. Likewise, the receiver connector housing 832 further has a ridge 844 near the back side 846 of the receiver connector housing 832 for receiving a clip.

An alternative embodiment of an ITA module assembly of the present invention is described with reference to FIG. 27. The ITA module assembly 810 includes an ITA connector housing 812 having a plurality of openings 814 (not shown) for receiving connectors. The ITA connector housing 812 further includes on each side near its face 818 a ridge 22 for receiving a clip 56. The receiver module assembly further includes on each of its sides a ridge 824 near the back side 825 of the connector housing 812.

Figure 18:
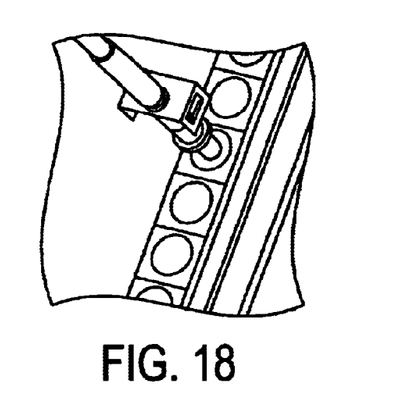
FIG. 18 is a perspective view of a fiber optic cable assembly of the present invention being inserted into a receiver module housing of the present invention.
Figure 19:
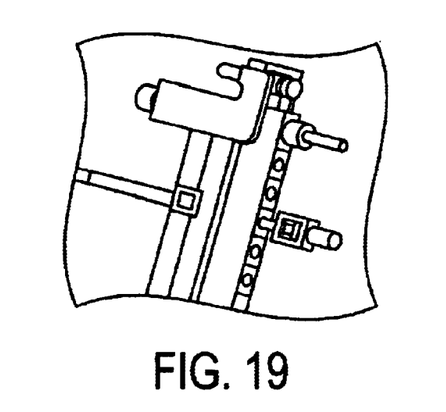
FIG. 19 is a perspective view of an alignment sleeve assembly of the present invention being connected to a receiver module assembly of the present invention.
Figure 20:
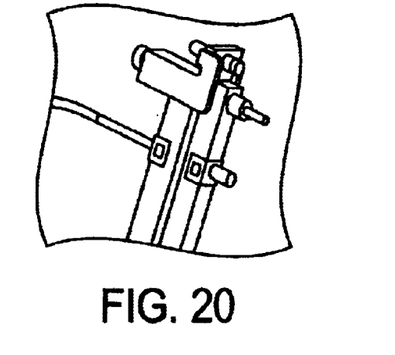
FIG. 20 is a perspective view of a receiver module assembly, fiber optic cable assembly, and alignment sleeve assembly of the present invention.

A fiber optic cable assembly 70 is mounted on a receiver module assembly 800 by inserting the fiber optic cable 74 and connector 76 into the openings in the back side 846 of the receiver module assembly 800 such that the cable 74 projects slightly from the face 840 of the receiver module connector housing 832 as shown in FIGS. 18 and 20. When so inserted, the retainer prongs 86 on the clip 80 snap onto the ridge 844 near the back side 846 of the receiver module housing 832. The alignment sleeve assembly is inserted into the face of a receiver module housing 832 as shown in FIG. 19.

Figure 22:
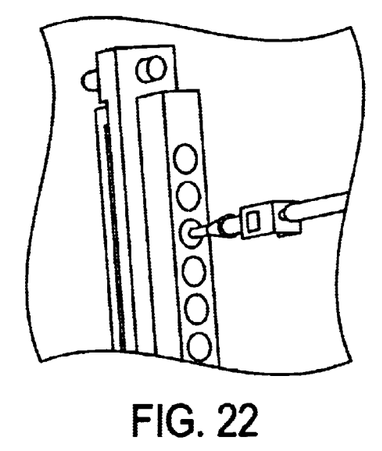
FIG. 22 is a perspective view of a fiber optic cable assembly being inserted into an ITA module assembly in one embodiment of the present invention.
Figure 23:
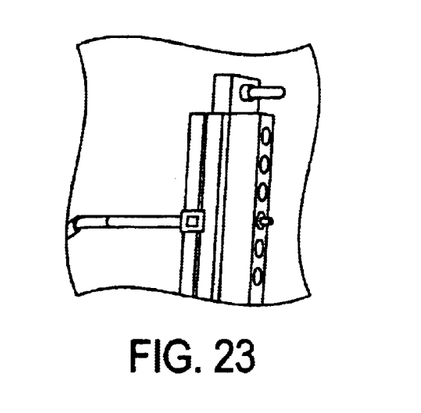
FIG. 23 is a perspective view of a fiber optic cable assembly assembled together with an ITA module assembly in one embodiment of the present invention.

A fiber optic connector assembly is mounted on an ITA module assembly 850 by inserting the fiber optic cable 74 and the connector 76 into the holes in the back side 825 of the ITA connector housing 812 as shown in FIGS. 22–23. When the fiber optic connector 76 is so inserted, the retainer prongs 86 on the clip 80 snap onto the ridge 824 near the back side 825 of the ITA connector housing 812.

Figure 25:
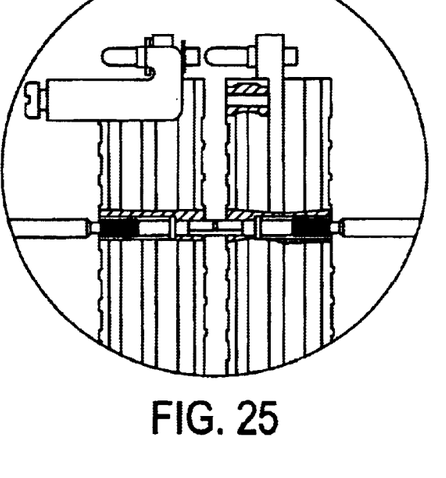
FIG. 25 is a side view of a mated receiver and ITA module pair with a fiber optic patch cord assembly in one embodiment of the present invention.

The ITA module assembly 850 is then mated to the receiver module assembly 800 to form a fiber optic connection, as shown in FIG. 25. To mate the two assemblies, the pins 16 extending from the face of the receiver module assembly 800 are aligned with and inserted into the holes 836 in the face 818 of the ITA module connector housing 812. As the receiver and ITA module assemblies 800 and 850 are pushed together, the fiber optic connectors 76 extending slightly from the face of the ITA module assembly 850 enter into the alignment sleeve housing 50 and align with the fiber optic cables 76 in the receiver module assembly 32.

Figures 16A, 16C:
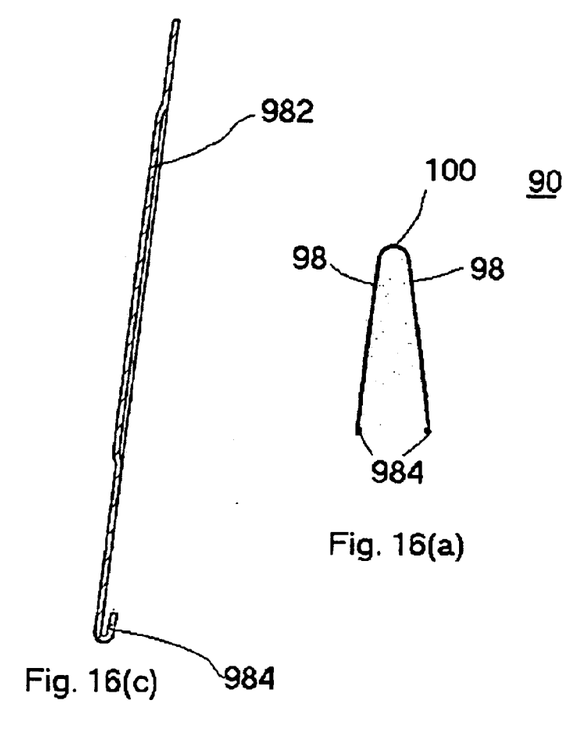
Figure 16B:
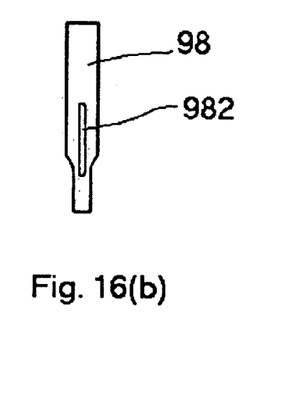
Figure 17A:
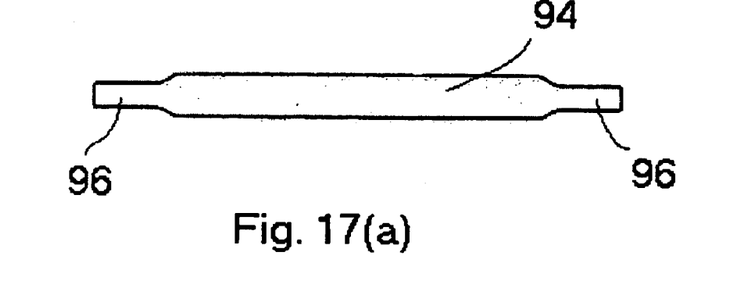
FIGS. 17(a) and (b) are top and side views of a clip removal tool during a production stage.
Figure 17B:
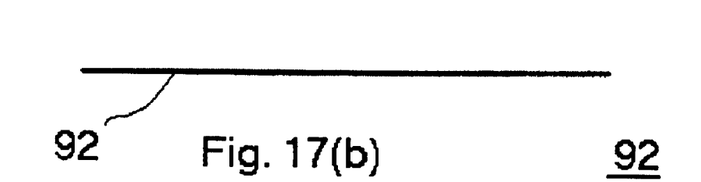
Figure 21:
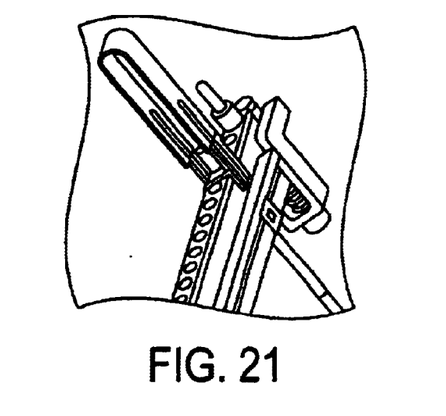
FIG. 21 is a perspective view of an alignment sleeve assembly of the present invention being removed from a receiver module assembly in one embodiment of the present invention.
Figure 24:
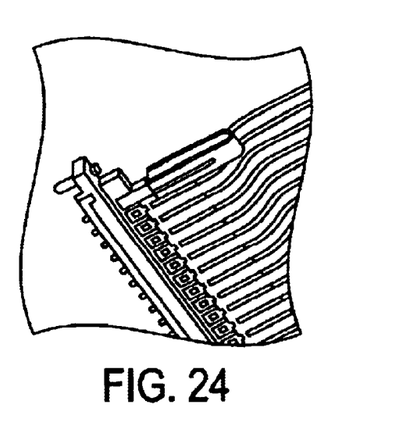
FIG. 24 is a perspective view of a fiber optic cable assembly being removed from an ITA module assembly in one embodiment of the present invention.

To remove a fiber optic cable assembly from either an ITA module or a receiver module, a simple clip removal tool 90, shown in FIGS. 16(*a*), (*b*), and (*c*) tool may be used, as shown in FIGS. 21 and 24. The crimp removal tool may be formed from a metal strip 92, such as stainless steel, having a wide center portion 94 and narrow ends 96, as shown in FIGS. 17(*a*) and (*b*). The metal strip 92 is bent to form a v-shape with two sides 98 and a rounded base 100 as shown in FIG. 16(*a*). Each side 98 is further bent or formed to include and indentation 982 near the middle of the side and a hook 984 at the end of the side. To remove a fiber optic cable assembly from a module, the clip removal tool is placed over the fiber optic cable assembly and the sides of the clip removal tool are manually compressed to position the hoods 984 on the clip removal tool 90 over the edges of the termini retainer clip. When the sides of the clip removal tool are released, the hooks 984 at the ends of the sides of the clip removal tool pull the sides of the termini retainer clip away from the connector module housing thereby releasing the tabs on the termini retainer clip from the ridge on the connector housing. The fiber optic cable assembly may then be removed from the connector housing.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents.

What is claimed is:

1. A connector module assembly comprising:

a connector housing having two opposing sides, two ends, a face, and a back, wherein each of the two opposing sides has a ridge for receiving a clip and said face has a plurality of openings extending through to said back for receiving connectors, wherein said connector housing has an opening near each end for receiving a guide post of a different connector module assembly;

a guide post connected near each end of said connector housing and protruding from said back of said connector housing;

a module support bracket having a base and at least two sides projecting from said base and extending over one of said ends of said connector housing and over at least a portion of each of said opposing sides of said connector housing, wherein said base has an opening for receiving said guide post; and a spring on said guide post for biasing said module support bracket away from said back of said connector housing.

2. A connector module assembly according to claim 1 further comprising a module guide pin.

3. A connector module assembly according to claim 1 further comprising:

a plurality of connectors inserted into said connector housing; and a connector module cover.

4. A module alignment sleeve assembly comprising:

a hollow alignment sleeve housing having a protrusion from an external surface for positioning said housing within a module and a protrusion extending from an internal surface at one end for positioning an alignment sleeve within said alignment sleeve housing;

an alignment sleeve in said alignment sleeve housing; and a retainer clip having a base and two opposing sides, said base having an opening therein for receiving said alignment sleeve housing and said two opposing sides each having an opening therein and a prong portion on an edge of said opening protruding slightly toward said opposing side.

5. An alignment sleeve assembly according to claim 4 wherein said opening is said base of said retainer clip is circular in shape.

6. A fiber optic cable connector assembly comprising:

a pin body;

a spacer around a first portion of said pin body;

a spring around a second portion of said pin body;

a retainer clip comprising
      a base having an opening therein for receiving a pin body and
      two opposing sides each having an opening therein and a prong projecting from at least a portion of an edge of said opening toward said opposing side; wherein said retainer clip is positioned on said pin body at one end of said spring for securing said fiber optic cable connector assembly to a module, and wherein said spring biases said clip away from a tip of said pin body; and a retainer ring for holding said retainer clip on said pin body.

7. A fiber optic cable connector assembly according to claim 6 wherein said opening in said base of said retainer clip is a D-shaped hole.

8. A fiber optic cable connector assembly according to claim 6 wherein said opening in said base of said retainer clip is positioned off-center in said base.

9. A connector module assembly according to claim 1 further comprising a retainer clip for a connector comprising:

a base having a D-shaped hole therein for receiving a pin body and axially positioning said pin body within said D-shaped hole; and two opposing sides each having an opening therein and a prong projecting from at least a portion of an edge of said opening toward said opposing side.

10. A retainer clip according to claim 9 wherein in said base further has a tab protruding from one edge of said base.

* * * * *